Feb. 22, 1966   W. M. OSTRANDER ETAL   3,236,970
ROTARY STEPPER SWITCH

Filed Sept. 3, 1963   2 Sheets-Sheet 1

INVENTORS
WALTER M. OSTRANDER
ARTHUR W. BENNETT
SINCLAIR N. SUTHERLAND

BY Mandeville & Schweitzer
ATTORNEYS

Feb. 22, 1966   W. M. OSTRANDER ETAL   3,236,970
ROTARY STEPPER SWITCH
Filed Sept. 3, 1963   2 Sheets-Sheet 2

INVENTORS
WALTER M. OSTRANDER
ARTHUR W. BENNETT
SINCLAIR N. SUTHERLAND
BY *Mandeville & Schweitzer*
ATTORNEYS

United States Patent Office 3,236,970
Patented Feb. 22, 1966

3,236,970
ROTARY STEPPER SWITCH
Walter M. Ostrander, New Milford, Arthur W. Bennett, Wolcott, and Sinclair N. Sutherland, New Haven, Conn., assignors to Consolidated Electronics Industries Corp., Waterbury, Conn., a corporation of Delaware
Filed Sept. 3, 1963, Ser. No. 306,185
20 Claims. (Cl. 200—105)

The present invention relates to rotary electrical switches, and more particularly to a torsion spring driven, solenoid operated stepper switch adapted to be used in sonar buoys and other like devices where unusually high deceleration forces and shock are encountered in their intended applications.

With the rapidly expanding defense technology has come an increasing demand for reliable mechanisms and new "hardware" to accomplish conventional, sequential switching functions in spite of being subjected to unusual and severe external forces. Additionally, there has been a demand for switch mechanisms of miniaturized size and of minimal mass to accomplish what may be referred to as normal functions in an abnormal environment.

Stepping switch devices themselves are well known in the art; however, many of the conventional switches of this general category have been unable to meet stringent military requirements and to cope with new and specific defense applications. More specifically, such switches have been found to be unsuited and inadequate for sonar buoy applications, for, among other reasons, these conventional switches exceeded the new and rigid minimal size and minimal mass requirements, and they were no longer reliable when subjected to the severe deceleration forces and shock that are prevalent in such applications.

The switch of the present invention represents a recently developed and workable solution to the problem of providing a miniaturized, efficient, and reliable stepper switch for sonar buoy applications, which switch has a minimum number of parts, a minimum mass, a minimum total volumetric displacement, and functions reliably and independently of any changes in deceleration forces and shock to which it might be subjected.

An important component of the new switch is a novel escapement mechanism especially developed therefor. In known escapements, a shaft, tending to be continuously rotated, has its output modified by the cooperation of an escape wheel and locking pawl so that the output is intermittent rather than continuous. Conventionally, the escape wheel has a plurality of detents disposed in a single locking plane and is fixed to the shaft whose rotation causes the escape wheel to be rotated in the plane of the detents. The locking pawl is moved into and out of that plane to engage periodically the detents of the escape wheel and to stall the shaft to give it a resultant, intermittent output. However, in accordance with an important aspect of the invention, the detents of the new escapement are maintained fixed in two locking planes, rather than being conventionally disposed in a single plane on the rotating escape wheel, and the pawl means of the invention is incorporated with and rotates with the escape wheel. The new escape wheel, itself, is axially movable into and out of the two detent planes. This new and improved arrangement allows the use of an escape wheel having an extremely low mass and has proved to be especially advantageous for the applications contemplated.

A preferred embodiment of the novel escapement mechanism of the invention has a solenoid actuated, single-toothed, planar escape wheel and lock-ring type detent. The new and improved escapement is extremely compact, has little weight, and affords a positive indexing of a clock spring driven rotor shaft with a minimal axial movement thereof to perform a predetermined series of sequential switching functions. Specifically, the lock-ring detent has two series of circularly arrayed locking teeth staggeredly disposed in two adjacent detent planes. Escape or release of the escape element from one of the series of teeth is accomplished by a slight axial movement of a single escape tooth from one of the detent planes of the lock ring to the other to allow a predetermined rotation of the escape element and the rotor shaft, the degree of rotation being a function of the spacing and staggering of the locking teeth. The slight axial or "unlocking" displacement of the escape element or escape tooth, which, itself, is of a substantially planar configuration, between the locking planes of the lock ring is provided by an opposed solenoid and spring combination which alternately and intermittently urges the escape wheel carrying the escape tooth into one or the other of the locking planes upon the energizing and de-energizing of the solenoid. In accordance with another important aspect of the invention, the structure of the new escapement allows the use of a solenoid with a very short throw and high armature-to-core efficiency.

Neutralization of ordinarily adverse effects of large deceleration forces, to which the new and improved escapement is to be subjected, is accomplished with a unique shock absorbing system which accommodates compensated displacement of the elements of the escapement caused by the excessive deceleration forces. Specifically, the escape element and lock-ring detent are "floatingly" mounted in a housing for unidirectional movement relative thereto in the direction of solenoid actuation and in a direction opposite to that of the deceleration forces. The escapement elements are biased by shock absorbing springs which have spring constants which provide for predetermined displacement of each of the elements subjected to deceleration forces. Thus, deceleration forces may act upon the escapement and actually displace each of its components relative to the switch housing, but the displacements will be precisely controlled to insure that the escapement elements will be free of any spurious "unlocking" displacement with respect to one another. Therefore, the reliability of the operation of the escapement will be unaffected by deceleration and shock.

In accordance with another aspect of the invention, great economies in production of miniaturized stepping switches are realized through the provision of multiple functioning elements. Specifically, a housing cover for the switch is used to wind-up a clock spring drive for the novel escapement mechanism, while an armature return spring serves to establish electrical continuity between a common terminal and a multiple contact of the switch.

For a more complete understanding of the nature of the present invention and for further specific features thereof, and advantages to be obtained therefrom, reference should be had to the accompanying drawings, in which:

FIG. 1 is a cross-sectional view showing a rotary stepper switch embodying the principles of the present invention;

FIGS. 2 and 3 are cross-sectional views of the mechanism of FIG. 1 taken along lines 2—2 and 3—3 thereof, respectively;

Figure 1:
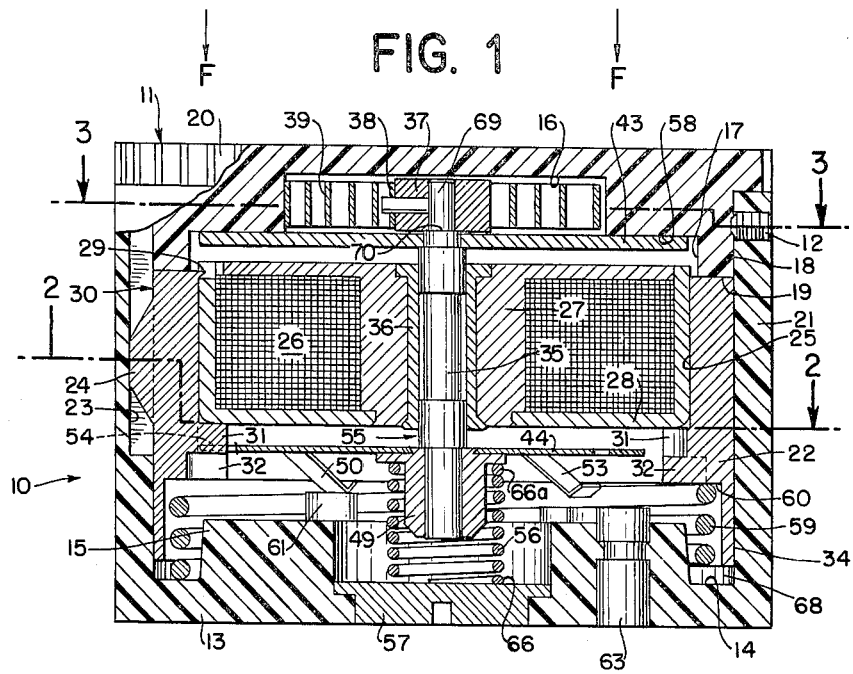

Referring to FIG. 1 of the drawing, the rotary stepper switch of the present invention is supported in a cylindrical housing 10 having a cylindrical cover 11 internally mated therewith and secured thereto by a set screw 12. The base 13 of the housing 10 is cup-shaped and defines a housing floor 14 and a switch deck 15 in the lower portions of the housing, the function of which will be explained in greater detail hereinafter. The cover 11 is internally stepped to define a torsion spring recess 16 in the center of the cover and an armature recess 17 concentric therewith. The side walls 18 of the cover define a stopping surface 19 at their lower extremities. Advantageously, the cover 11 has a knurled circular flange 20 which terminates coincident with the profile of the housing 10 and abuts the upper edges of the housing walls 21.

A novel lock-ring detent element 22, which constitutes an important element of the new and improved escapement mechanism of the present invention, is keyed to the walls 21 of the housing in a longitudinally disposed keyway 23 by a key 24. The lock-ring element 22 is substantially cylindrical in shape and is slidingly mounted within the housing so that it may have limited vertical movement along its walls 21. The upper inner portions 25 of the lock-ring element 22 support an annular electromagnetic clutch coil 26 which is wound about a ferrous core 27 and surrounded by a ferrous clutch cup 28. As may be seen from FIG. 1, the clutch cup 28, the coil 26, the core 27, and the lock ring 22 are locked together by a projection 29 to form an integral "lock-ring unit" 30, which is adapted to move vertically relative to the housing 10.

Figure 2:
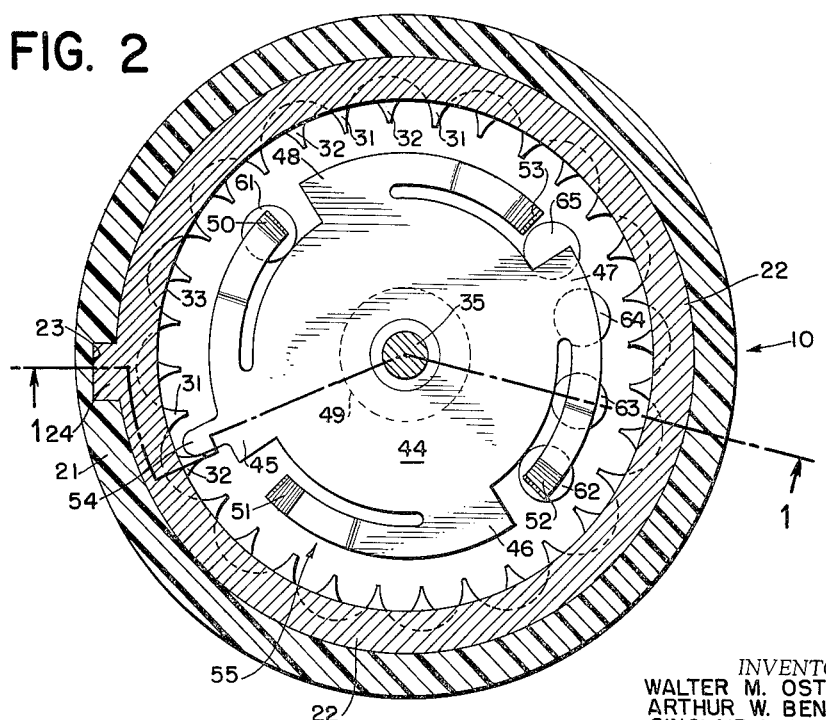
Figure 5:
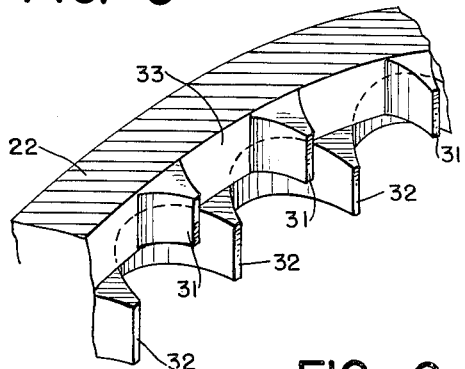
FIG. 5 is a fragmentary, perspective view showing the details of construction of the locking teeth of a lock-ring detent made in accordance with the principles of the present invention.

In accordance with the principles of the present invention, intermediate inner portions of the lock-ring element define, along two immediately adjacent planes thereof (which planes for the purposes of clear description will be referred to hereinafter as upper and lower planes), a plurality of upper and lower detent teeth 31, 32, respectively. As may be best seen from FIG. 5, the upper teeth 31 are arrayed about and project radially inwardly from a ring 33 formed by the cylindrical wall of the lock-ring element 22. The lower teeth 32 are similarly arrayed, but in a staggered relationship with the upper teeth 31 so that each of the lower teeth 32 lies intermediate the upper teeth 31 when viewed in profile, as illustrated in FIG. 2. The lower portion 34 of the lock-ring element 22 is undercut from the locking teeth 31, 32 and extends downwardly into an annular recess 68, formed by the wall 21 and the cup-shaped base 13 of the housing. As shown in FIG. 1, the lower portion terminates before reaching the housing floor 14 to provide a clearance therebetween.

Figure 3:
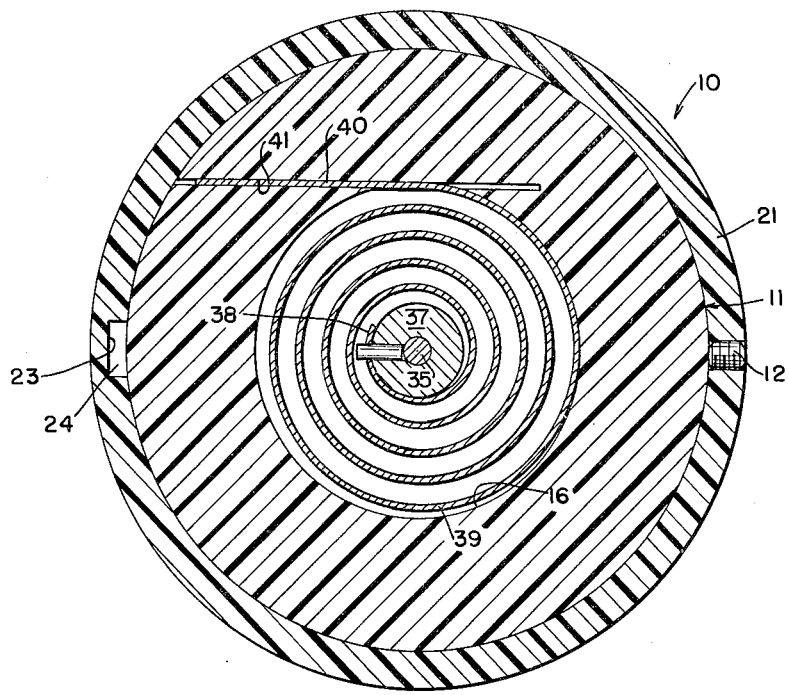

A stepped drive shaft 35 is mounted in a bearing 36 mounted within the core 27 of the solenoid for rotary as well as axial motion relative thereto. At its upper end, the shaft 35 has a collet 37 pressed thereon, which collet is pinned to the inner end 38 of a spiral clock spring 39 for the dual purposes of winding the spring and transmitting stored torsional forces therein to the shaft to cause its rotation. The clock spring, at its outer end 40, is pressed into slots 41 formed in the cover 11 by means of a saw, as best shown in FIG. 3. As will be understood, the collet 37 is adapted to hold the spring 39 as it is wound in a counter-clockwise direction upon itself upon rotation of the knurled cover 11.

Floatingly mounted on a reduced end portion 69 against a shoulder 70 formed thereon is a disc-like, ferrous armature 43. In accordance with the invention, a metallic escape wheel 44 having four radial spokes 45–48 is fixed to the shaft below the solenoid coil by means of a flanged, metallic hub 49. The spokes 45–48 which, advantageously, are disposed at ninety degree intervals, have resilient, circumferential metallic brushes 50–53, respectively, integral therewith and extending downwardly therefrom. In accordance with the principles of the invention, a single, planar escape tooth 54 extends radially outwardly from the escape wheel spoke 45 beyond the radially inwardly projecting teeth 31, 32, as clearly shown in FIGS. 1 and 2. The shaft 35, armature disc 43, escape wheel 44, and brushes 50–53 constitute an integral "escape wheel unit" indicated generally by the reference numeral 55.

The stepper switch of the present invention is adapted to be mounted in sonar buoys with the housing disposed in a manner that when the sonar buoy is dropped from an airplane into the sea, the deceleration forces "F" act normally thereto and in the direction of solenoid actuatio, as shown in FIG. 1. In accordance with one aspect of the invention, a small, light, armature return spring 56 acts between a common terminal 57 in the switch deck 15 and the flange of the escape wheel hub 49 to urge the escape wheel unit 55 upwardly (directions "upwardly" and "downwardly" are with reference to the drawings) into a normal rest position in which the armature disc 43 abuts the top wall 58 of the recess 17 in the housing cover; and a relatively heavy coil spring 59 acts between the housing floor 14 and the underside 60 of the lower teeth to urge the clock-ring unit 30 upwardly against the stopping surfaces 19 of the cover 11. In this upper or rest position, the escape tooth 54 is in the upper plane, the plane of the upper teeth 31, immediately adjacent the plane of the lower teeth 32, as shown in FIG. 1. In accordance with the invention, the spring constants of the springs 59, 56, are specifically related to the total masses of the lock-ring unit 30 and escape wheel unit 55, respectively, such that at the advent of deceleration or shock, the heavier mass of the lock-ring unit 30 bottoms in the housing before the lighter mass of the escape wheel unit 55 starts to move relative to the housing. Thus, when the lock-ring unit 30 is bottomed in the housing, it is not possible for the planar escape tooth 54 of the escape wheel to move into the lower plane by virtue of the shaft 35 having come to rest against the bottom of the housing. This feature prevents "unlocking" of the escapement by external forces.

A series of switch contact posts 61–65 is mounted concentrically with the switch deck 15, and, as shown clearly in FIG. 1, the posts are embedded in and extend upwardly from the inner surface of the switch deck with the post 61 having a greater height relative thereto than the posts 62–65. The differential in the heights of the posts is such that the posts 62–65 may be wiped by the brushes 50–53 only when the escape wheel unit 55 is in an active or lower position, whereas, the post 61 makes contact with the brushes in the upper or deenergized position of the escape wheel unit. The upper position of the escape wheel unit 55 is defined as the position in which the armature disc 43 abuts the cover 11 and the escape tooth 54 is disposed in the plane of the upper teeth 31. Correspondingly, the lower position of the escape wheel unit is the position in which the armature is "held-in" by the solenoid coil 26 and the escape tooth 54 is disposed in the plane of the lower teeth 32. In accordance with the teachings of the invention, the throw or travel between the upper and lower positions is minimized to achieve maximum solenoid efficiency.

In accordance with another aspect of the invention, the common terminal 57 of the stepper switch of the present invention is electrically linked by one free end 66 of the armature return spring 56 to the brushes 50–53. More specifically, an electrical circuit may be completed between the free end 66 and each of the post contacts 61–65 through the other free end of the spring, contact 66a, the metallic hub 49, escape wheel 44 and brushes 50–53. Advantageously, the housing 10, cover 11, and lock ring 22 are all fabricated from a suitable, non-metallic dielectric material to provide necessary insulation of the switch contact elements 61–66.

Figure 6:
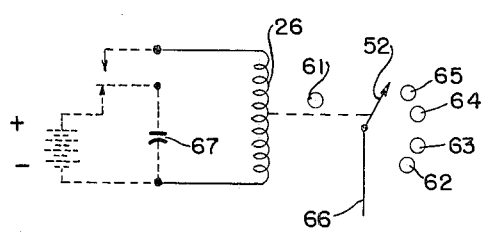
FIG. 6 is a schematic wiring diagram for the stepper switch of the invention.

In its operation, the stepper switch of the present invention is adapted to provide consecutive output pulses through the contact terminals 61–65 upon successive energization of the solenoid coil 26 by the discharge of a capacitor 67, shown schematically in FIG. 6. The solenoid coil 26, upon being energized, provides for the axial displacement of the escape element relative to the lock ring to effect its "escape," however, it may be subject to changes in its resistance due to variations in temperature contemplated to be within the range of minus 20° C. to plus 45° C. Thus, series energization of the coil by D.C. pulses might not in all instances be entirely reliable. Therefore, in accordance with the invention, the solenoid 26 is actuated by a capacitor discharge to give the escapement a uniform output. The use of capacitor discharge energization permits the avoidance of high resistance in the winding of the solenoid. With a low resistance winding, resistance variations resulting from changes in temperature over the contemplated range do not result in excessive time variations in the discharge of the capacitor. Accordingly, the operation of the unit is substantially unaffected by changes in the temperature of its winding.

Figure 4:
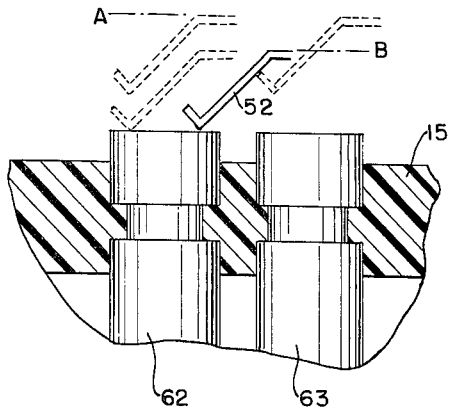
FIG. 4 is an enlarged, side elevational view of the switch contacts and a wiper blade made in accordance with the principles of the present invention.

Specifically, to operate the switch, the cover 11 is rotated in the counter-clockwise direction to wind up the clock spring 39, which tends to rotate the drive shaft 35 in the counter-clockwise direction as it unwinds. With the coil unenergized, the escape tooth 54 and escape wheel 44 are urged into the upper position in the plane of the upper teeth 31 by the light coil spring 56, as shown in FIG. 1. In the upper position, the angular free ends 68 of the brushes are in a plane "A," shown in FIG. 4, above the surface of the contacts 62–65, in a non-wiping position, but in wiping position with respect to the "home" contact 61, as may also be seen in FIG. 1. When the solenoid is energized, however, the free ends of the brushes are moved downwardly onto the top surface of the terminal posts into a contact wiping position in plane "B," where they may cleanly wipe the shorter terminals 62–65, as shown in FIG. 4.

The drive shaft 35 will be continuously, rotatively urged in the counter-clockwise direction by the wound clock spring 39; however, the shaft will be free to rotate only until its progress is blocked by a detent or locking tooth in the plane of rotation of the escape element. Thus, assuming that the escape wheel is blocked in the upper plane by a tooth 31, axial downward movement of the shaft, caused by energization of the coil 26 to attract the armature disc 43 theretoward, will free the escape tooth 54 from the upper teeth 31 and will allow the shaft to rotate in the lower plane until the wheel is again blocked by a lower tooth 32.

In accordance with the invention, the floating mounting of the disc 43 on the shaft 35 accommodates downward movement of the shaft through the cooperation of the disc and the shoulder 70 when the coil is energized, while not restricting the rotation of the shaft when the armature disc 43 is attracted to the energized coil. Thus, subsequent de-energization of the solenoid causes the drive shaft 35 to be urged upwardly by the light spring 56 to free the escape tooth 54 from the lower teeth and allow the shaft to rotate until it is blocked by the next successive tooth.

As an important aspect of the invention, the novel escapement mechanism allows the use of an escape element having a very low mass. Accordingly, the escape tooth 54 and escape wheel 44 are fabricated from a relatively thin sheet material, and, therefore, may be indexed with a minimal axial shaft movement and armature throw. Thus, the gap between the armature and solenoid cup may be greatly minimized, maximizing the armature-to-core efficiency. In production models of the illustrated, preferred embodiment of the invention, axial movement of the shaft has been reduced to 0.036 inch, while maintaining very reliable and efficient operation. The aforementioned features contribute importantly and significantly to the extreme miniaturization and high overall efficiency obtainable in a stepping switch made in accordance with the invention.

In a typical sonar buoy application, the stepper switch is used for a complete switching cycle, which commences with the brushes in a "make ready" position, shown in FIG. 2, in which the switch is adapted to be energized to deliver consecutive output pulses successively through the terminals 62–65. Subsequent energization of the coil 26 by the discharge of the capacitor 67, will cause the escape wheel to be unlocked by the upper teeth and rotated in the plane of the lower teeth. Typically, the circuit parameters and the mechanical characteristics of the springs 39, 56 combine to allow the brush 52 to rotate in the plane "B" to make contact with each terminal post for a five milli-second duration in a "switch on" position. It is to be understood, of course, that the design parameters may be varied to achieve greater or lesser "switch on" times. When the external capacitor voltage is lower than the coil "hold-in" voltage, the armature 43 will be returned to the upper position to allow the brush 52 to continue its advance due to the stored energy of the spring 39 in the plane "A" to a "switch off" position above the next terminal 63, as shown in FIG. 4. The brush 52 will index in that fashion until the brush 53 reaches the home terminal 61 to complete the switching cycle. Advantageously, the clock spring stores sufficient energy when wound to allow the other brushes to complete several cycles of operation.

It will be appreciated that the new rotary stepper switch is particularly advantageous in respect of its extreme structural simplicity, involving a minimum of individual parts. Thus, in accordance with the invention, a stepper switch may be economically and practically manufactured in extremely small, miniaturized sizes. By way of example only, a typical stepper switch constructed according to the present invention may be contained in a cylindrical housing having a maximum outside diameter of 1¼ inches and a height not in excess of ⅞ inch.

The new and improved stepper switch, embodying the principles of the present invention, provides a sequential rotary switching mechanism whose operation is unaffected by deceleration forces and shock. Furthermore, the structure of the components of the new switch, specifically the new escapement mechanism, allows the entire unit to be highly miniaturized and allows the use of a solenoid with a very short throw, maximizing armature-to-core efficiency.

As will be understood, the specific mechanism herein illustrated and described may be modified in various respects without departing from the clear teachings of the disclosure. Accordingly, reference should be made to the following appended claims in determining the full scope of the invention.

We claim:
1. A rotary stepper switch comprising
 (a) a housing having a substantially cylindrical opening therein,
 (b) a base closing one end of said housing,
 (c) a cover closing the other end of said housing,
 (d) a circular lock ring mounted in said housing,
 (e) first and second locking teeth projecting radially inwardly from said lock ring in first and second immediately adjacent locking planes,
 (f) said first and second teeth being staggered in said first and second planes,
 (g) annular electromagnetic coil means carried by said lock ring,
 (h) a drive shaft mounted within said housing for rotary and axial movement relative thereto,
 (i) an armature plate floatingly mounted on said shaft,
 (j) an escape wheel fixedly mounted to said shaft,

(k) said escape wheel having a planar escape tooth projecting radially outwardly beyond said inwardly projecting locking teeth,
(l) torsion spring means acting between said housing and said shaft to urge said shaft to rotate in a predetermined direction,
(m) a coil spring means acting between said housing and said shaft to urge said shaft into a predetermined position in which said escape tooth is in said first plane,
(n) contact elements mounted in a circular array within said housing,
(o) switch brush means carried by said escape wheel and adapted to wipe said contact elements,
(p) said coil being adapted to be energized to cause said armature to be attracted theretoward to allow said escape tooth to be moved into said second locking plane, each interplanar movement of said escape tooth thereby allowing a predetermined rotation of said shaft by said torsion spring,
(q) whereby periodic energization of said coil causes said armature and said brush means to be rotated steppingly to wipe sequentially said contact elements.

2. The rotary stepper switch of claim 1, in which
(a) said lock ring is slidably mounted in said housing,
(b) said housing and said lock ring include means to prevent the relative rotation thereof,
(c) a shock absorbing spring means urges said lock ring into a predetermined position.

3. The rotary stepper switch of claim 1, in which
(a) said coil spring means is electrically connected to said brush means,
(b) said coil spring means has a free end which is connected to a common terminal,
(c) whereby electrical circuits between said terminal and said contact elements may be sequentially completed by the rotation of said brush means.

4. The rotary stepper switch of claim 1, in which
(a) said contact elements are mounted in the base of said housing,
(b) said contact elements project in first and second predetermined heights therefrom,
(c) whereby said contact elements of said first heights are adapted to be wiped by said brush means when said escape tooth is in said first and second locking planes and said elements of said second heights are adapted to be wiped by said brush means in said second locking plane only.

5. The rotary stepper switch of claim 1, in which
(a) said coil is adapted to be energized by the discharge of a capacitor in series with a D.C. source.

6. The rotary stepper switch of claim 1, in which
(a) said torsion spring is affixed to said cover,
(b) said cover is rotatably mounted within said housing,
(c) whereby said torsion spring may be wound by the rotation of said cover.

7. An escapement mechanism comprising
(a) a rotatable output shaft,
(b) power input means tending to rotate continuously said shaft in a predetermined direction,
(c) means supporting said shaft for rotation therein and axial movement relative thereto,
(d) an escape element carried by said shaft and rotatable therewith,
(e) means for reciprocating said shaft axially between first and second predetermined positions,
(f) said escape element defining axially spaced first and second substantially circular paths, respectively, when rotated in said first and second predetermined axial positions,
(g) first and second stop means located respectively in the separate planes of said first and second paths and maintained in a fixed relation with respect to said means supporting said shaft,
(h) said first stop means being staggered with respect to said second stop means,
(i) whereby axial movement of said escape element from one path to the other accommodates predetermined limited rotation of said shaft by said power means until said escape element is prevented from further rotation by said stop means in said path.

8. An escapement mechanism according to claim 7, in which
(a) said escapement element includes a tooth-like locking portion.

9. An escapement mechanism according to claim 8, in which
(a) said tooth-like portion is substantially planar.

10. An escapement mechanism according to claim 7, in which
(a) said stop means are included in a ring-like element,
(b) said stop means are arrayed about the circumference of said ring-like element.

11. An escapement mechanism according to claim 7, in which
(a) said means for reciprocating said shaft includes a solenoid and a spring.

12. An escapement mechanism comprising
(a) a rotatable output shaft,
(b) power input means tending to rotate continuously said shaft in a predetermined direction,
(c) means supporting said shaft for rotation therein and axial movement relative thereto,
(d) an escape element carried by said shaft and rotatable therewith,
(e) means for reciprocating said shaft axially between first and second predetermined positions,
(f) said escape element defining first and second circular paths, respectively, when rotated in said first and second predetermined axial positions,
(g) first and second stop means including a plurality of teeth being located respectively in the planes of said first and second circular paths and being maintained in a fixed relation with said escape element,
(h) said teeth being circularly disposed about a predetermined diameter in two immediately adjacent planes with the teeth of said first stop means being staggered with respect to the teeth of said second stop means,
(i) said adjacent planes being coincident with the planes of said first and second circular paths of said escape element,
(j) whereby axial movements of said escape element from one circular path to the other accommodates predetermined limited rotation of said shaft by said power means until said escape element is prevented from further rotation by said stop means in said path.

13. A shock mounting for an escapement mechanism having a housing, a driving means, a shaft carrying a solenoid-actuated escape element, and a locking means for said escape element comprising
(a) a first spring means acting in a predetermined direction against said escape element and the armature of said solenoid to urge them into a rest position in said housing,
(b) a second spring means acting in said predetermined direction against said locking means and the coil of said solenoid to urge them into a rest position in said housing,
(c) said springs being related to the masses of said solenoid armature, solenoid coil, escape element, and locking means in a manner that deceleration forces applied to said escapement mechanism in a direction opposite to said predetermined direction allows said locking means and said solenoid coil to move in the direction of said forces into a bottomed position in said housing before said escape element starts to move relative to said housing.

14. A shock mounting according to claim 13, in which
(a) said springs are coil springs,
(b) said springs are located concentrically with one another.

15. A rotary stepper switch comprising
(a) a housing having a substantially cylindrical opening therein,
(b) a base closing one end of said housing,
(c) a cover closing the other end of said housing,
(d) a circular lock ring mounted in said housing,
(e) first and second locking teeth projecting radially inwardly from said lock ring in first and second immediately adjacent locking planes,
(f) said first and second teeth being staggered in said first and second planes,
(g) annular electromagnetic coil means carried by said lock ring,
(h) a drive shaft mounted within said housing for rotary and axial movement relative thereto,
(i) an armature plate floatingly mounted on said shaft,
(j) an escape wheel fixedly mounted to said shaft,
(k) said escape wheel having a planar escape tooth projecting radially outwardly beyond said inwardly projecting locking teeth,
(l) torsion spring means acting between said housing and said shaft to urge said shaft to rotate in a predetermined direction,
(m) spring means acting between said housing and said shaft to urge said shaft into a predetermined position in which said escape tooth is in said first plane,
(n) first switch contact means mounted in a circular array within said housing,
(o) second switch contact means carried by said escape wheel and adapted to engage said first contact means, at least one of said first and second switch contact means being of a resilient nature,
(p) said coil being adapted to be energized to cause said armature to be attracted theretoward to allow said escape tooth to be moved into said second locking plane, each interplanar movement of said escape tooth thereby allowing a predetermined rotation of said shaft by said torsion spring,
(q) whereby periodic energization of said coil causes said armature and said second contact means to be rotated steppingly to engage sequentially said first contact means.

16. The rotary stepper switch of claim 15, in which
(a) said lock ring is slidably mounted in said housing,
(b) said housing and said lock ring include means to prevent the relative rotation thereof,
(c) a shock absorbing springs means urges said lock ring into a predetermined position.

17. The rotary stepper switch of claim 15, in which
(a) said spring means includes a coil spring electrically connected to said second switch contact means,
(b) said spring means has a free end which is connected to a common terminal,
(c) whereby electrical circuits between said terminal and said first switch contact means may be sequentially completed by the rotation of said second switch contact means.

18. The rotary stepper switch of claim 15, in which
(a) said first switch contact means are mounted in the base of said housing and project therefrom in a predetermined greater and lesser heights,
(b) whereby said first contact means of said greater predetermined height is adapted to be engaged by said second contact means when said escape tooth is in said first locking plane and said first contact means of said lesser predetermined height is adapted to be engaged by said second contact means in said second locking plane only.

19. The rotary stepper switch of claim 15, in which
(a) said coil is adapted to be energized by the discharge of a capacitor in series with a D.C. source.

20. The rotary stepper switch of claim 15, in which
(a) said torsion spring is affixed to said cover,
(b) said cover is rotatably mounted within said housing,
(c) whereby said torsion spring may be wound by the rotation of said cover.

References Cited by the Examiner
UNITED STATES PATENTS 2,576,609  11/1951  Kriener _____ 200—105
2,875,292  2/1959  Saholt _____ 200—82

BERNARD A. GILHEANY, *Primary Examiner.*

ROBERT K. SCHAEFER, *Examiner.*